United States Patent [19]
Ginsberg et al.

[11] Patent Number: 5,721,871
[45] Date of Patent: Feb. 24, 1998

[54] MEMORY SYSTEM ENSURING COHERENCY FOR MEMORY BUFFERS IN A DATA COMMUNICATION SYSTEM

[75] Inventors: Avi Ginsberg, Petach-Tiquva; Yaniv Shapira, Tel Aviv; Yaron Ben-Arie, Ramat-Gan; Benjamin Rosen, Ganei Tikva, all of Israel

[73] Assignee: Motorola, Inc., Schaumburg, Ill.

[21] Appl. No.: 598,934

[22] Filed: Feb. 9, 1996

[51] Int. Cl.$^6$ .................................................. G06F 12/14

[52] U.S. Cl. .......................... 395/479; 395/477; 395/490; 395/726; 395/729

[58] Field of Search ........................... 395/479, 477, 395/490, 200.08, 726, 729

[56] References Cited

U.S. PATENT DOCUMENTS

| | | | |
|---|---|---|---|
| 4,380,798 | 4/1983 | Shannon et al. | 395/729 |
| 5,555,560 | 9/1996 | Komatsuda et al. | 395/479 |

*Primary Examiner*—Eddie P. Chan
*Assistant Examiner*—Reginald G. Bragdon
*Attorney, Agent, or Firm*—Paul J. Polansky

[57] ABSTRACT

A memory system (3) for storing data messages communicated between a processor unit (13) and a communication module (11) comprises a memory array (4) having a plurality of memory buffers (B0–BM) for storing the data messages. First logic circuitry (28) generates a lock signal for a memory buffer which lock signal is valid when the processor trait (13) reads the first data word of the data message stored in the memory buffer whilst the memory buffer is not being accessed by the communication module (11). Module decode logic (22) coupled to receive the lock signal prevents the communication module (11) from writing a data message to a memory buffer when a valid lock signal has been generated for that memory buffer. The memory system (3) further comprises second logic circuitry (30) for providing a busy signal to the processor unit (13) when the processor unit reads the first data word from a memory buffer. The busy signal forms part of the first data word read from the memory buffer, and its logic state indicates whether or not the memory buffer is being written to by the communication module (11).

20 Claims, 3 Drawing Sheets

MEMORY SYSTEM ENSURING COHERENCY FOR MEMORY BUFFERS IN A DATA COMMUNICATION SYSTEM

FIELD OF THE INVENTION

This invention relates to a memory system for storing data messages communicated between a processor unit and a communication module and a data communications system comprising such a memory system.

BACKGROUND OF THE INVENTION

Memory systems for storing data messages communicated between a processor unit and a communication module are typically used in communication systems in automotive and industrial applications, wherein the processor unit may be a CPU and the communication module a serial communications device.

In such known systems, the memory system receives data messages from the communication module which are destined for the processor unit and data messages from the processor unit which are destined for the communication module and stores the messages in a memory array which comprises a plurality of memory buffers. Some memory buffers contain data messages stored by the processor unit to be fetched by the communication module and some contain data messages received from the communication module to be fetched by the processor unit. The memory array is thus shared between the processor unit and communication module.

In systems handling data messages of at least two data words, each memory buffer must therefore store at least two words of data. The transfer of each such data message between the memory array and the processor unit or communication module requires a number of memory cycles and thus data coherency becomes an issue. Whilst the communication module or processor unit is transferring such a data message to or from the memory array, the other unit, the processor unit or communication module respectively, might intervene and corrupt the data or misinterpret the data.

Data coherency problems occur, for example, in the situation when the processor unit reads a memory buffer whilst the communication module is writing to the same memory buffer, since the processor unit may read part of a previous message and part of a new message. Similarly, data coherency problems occur when the communication module writes to the memory buffer whilst the processor is reading from the same memory buffer.

The problem of managing shared memory becomes crucial when the processor unit and communication module can simultaneously access the same memory buffer in opposite directions.

A known solution to this problem is to provide each memory buffer with two flags, one of which can be set to indicate that the buffer is being read, and the other of which can be set to indicate that the buffer is being written to. For example, if the communication module requires to write a data message to a memory buffer, the communication module reads the read flag of the buffer to check that it is not being read. If it is free, the communication module sets the write flag to indicate that the buffer is being written to, proceeds to write the message into the buffer and then resets the write flag to indicate that the buffer is free. Similarly, if the processor unit wishes to read a data message in a memory buffer, it reads the buffer's write flag to make sure the buffer is free, and when it is free, it accesses the buffer, sets the read flag to indicate the buffer is busy, reads the message and then resets the read flag to indicate that the buffer is once more free.

This is known as the semaphore system, but it suffers from the disadvantage that for each access of a memory buffer, the accessing unit must read one of the flags and then write the other flag twice, once before it accesses the buffer and once more after it finishes. This requires significant time and hence processor unit overhead for all three operations to take place. Moreover mistakes can easily occur.

There is therefore a need for an improved memory system which overcomes, or at least reduces, the problems and disadvantages of the prior art memory systems.

SUMMARY OF THE INVENTION

In accordance with the present invention there is provided a memory system for storing data messages communicated between a processor unit and a communication module. The memory system comprises a memory array having a plurality of memory buffers, each buffer for storing a data message comprising at least two data words. First logic circuitry generates a lock signal for a memory buffer, the lock signal being valid when the processor unit reads the first data word of the data message stored in the memory buffer whilst the memory buffer is not being accessed by the communication module. The lock signal for the memory buffer is invalidated when the processor unit reads the first data word of the data message stored in a different memory buffer. Module decode logic is coupled to the first logic circuitry to receive the lock signal. The module decode logic prevents the communication module from writing a data message to a memory buffer when a valid lock signal has been generated by the first logic circuitry for that memory buffer or allows the data message to be written to the memory buffer when the lock signal for that memory buffer is invalidated. The memory system further comprises second logic circuitry for generating and providing a busy signal to the processor unit when the processor unit reads the first data word from a memory buffer. The busy signal forms part of the first data word read from the memory buffer, and has a first logic state when the memory buffer is being written to by the communication module and has a second logic state when the memory buffer is not being written to by the communication module.

The present invention minimises processor unit overhead, minimises the required semaphore bits and simplifies the design of the communication module's control logic.

BRIEF DESCRIPTION OF THE DRAWINGS

A memory system and a data communications system in accordance with the invention will now be described, by way of example only, with reference to the accompanying drawings in which.

DETAILED DESCRIPTION OF THE DRAWINGS

Figure 1:
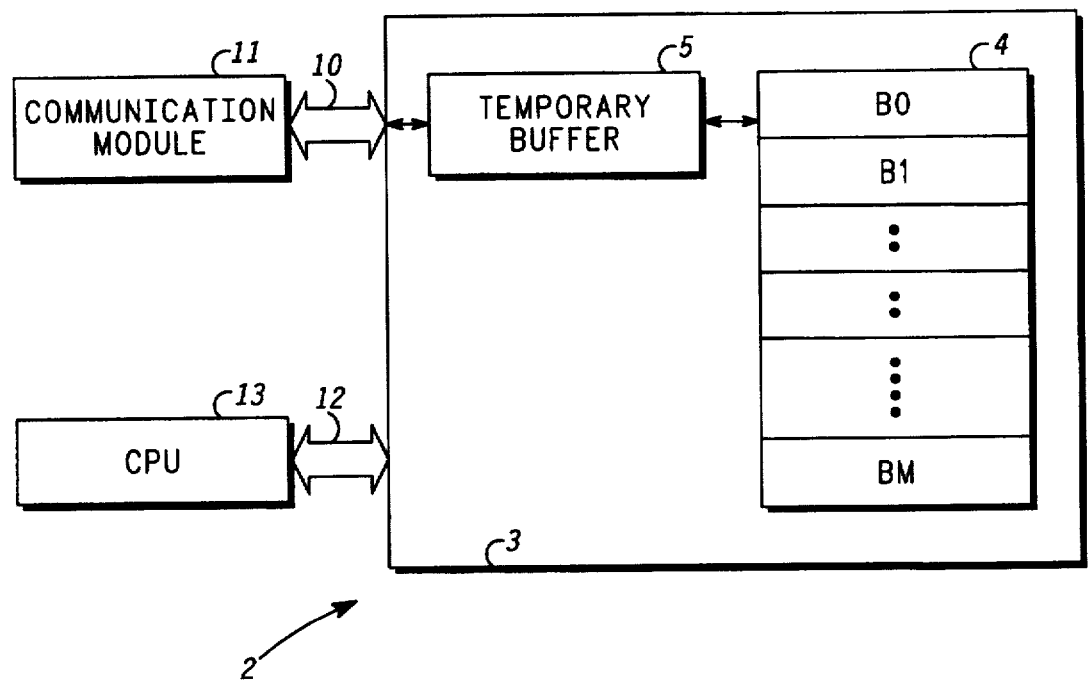
FIG. 1 is a block schematic diagram of a data communications system in accordance with the invention.

Referring to FIG. 1, a data communications system 2 in accordance with a preferred embodiment of the present invention includes a memory system 3 comprising a memory array 4 having a plurality of M memory buffers B0-BM for storing data messages communicated between a processor unit 13, such as a CPU, and a communication module 11, such as a serial communications device. Data messages are communicated to and from the communication module 11 via module data bus 10 and to and from the CPU 13 via CPU data bus 12. Preferably, the memory system 3 further comprises a temporary buffer 5 for temporarily holding data messages received from the communication module 11 to be stored in the memory array 4.

Some of the plurality of memory buffers B0-BM contain data messages stored by the CPU 13 to be fetched by the communication module 11, in order to be transferred to a media (not shown) external to the communication module 11. Some different memory buffers contain data messages received from external media (not shown) and then stored by the communication module 11 to be fetched by the CPU 13.

In the preferred embodiment, the memory array 4 is implemented as a virtual dual port Random Access Memory (RAM); that is, a physical single port RAM shared by the CPU 13 and the communication module 11. The invention is not, however, limited to RAM and may be implemented in other types of solid state memory.

Each data message transferred between the memory system 3 and the CPU 13 or the communication module 11 comprises at least two data words and therefore the transfer of each such data message requires a number of memory cycles. Data coherency thus becomes an issue. For example, when the CPU 13 starts to read a data message from memory buffer B0 whilst the communication module 11 is writing to the memory buffer B0, the CPU 13 may read data which is part of the new data just being written to the memory buffer B0 and data which is part of the old data that was stored in the memory buffer B0. In such a situation, the data message read by the CPU 13 will therefore be mixed and not coherent. Similarly, when the communication module 11 starts to write a data message to memory buffer B1 whilst the CPU 13 is reading a data message from the memory buffer B1, the data message read by the CPU 13 may again be mixed and not coherent.

The present invention seeks to avoid this data coherency problem without the disadvantages of the known semaphore system described above.

Figure 2:
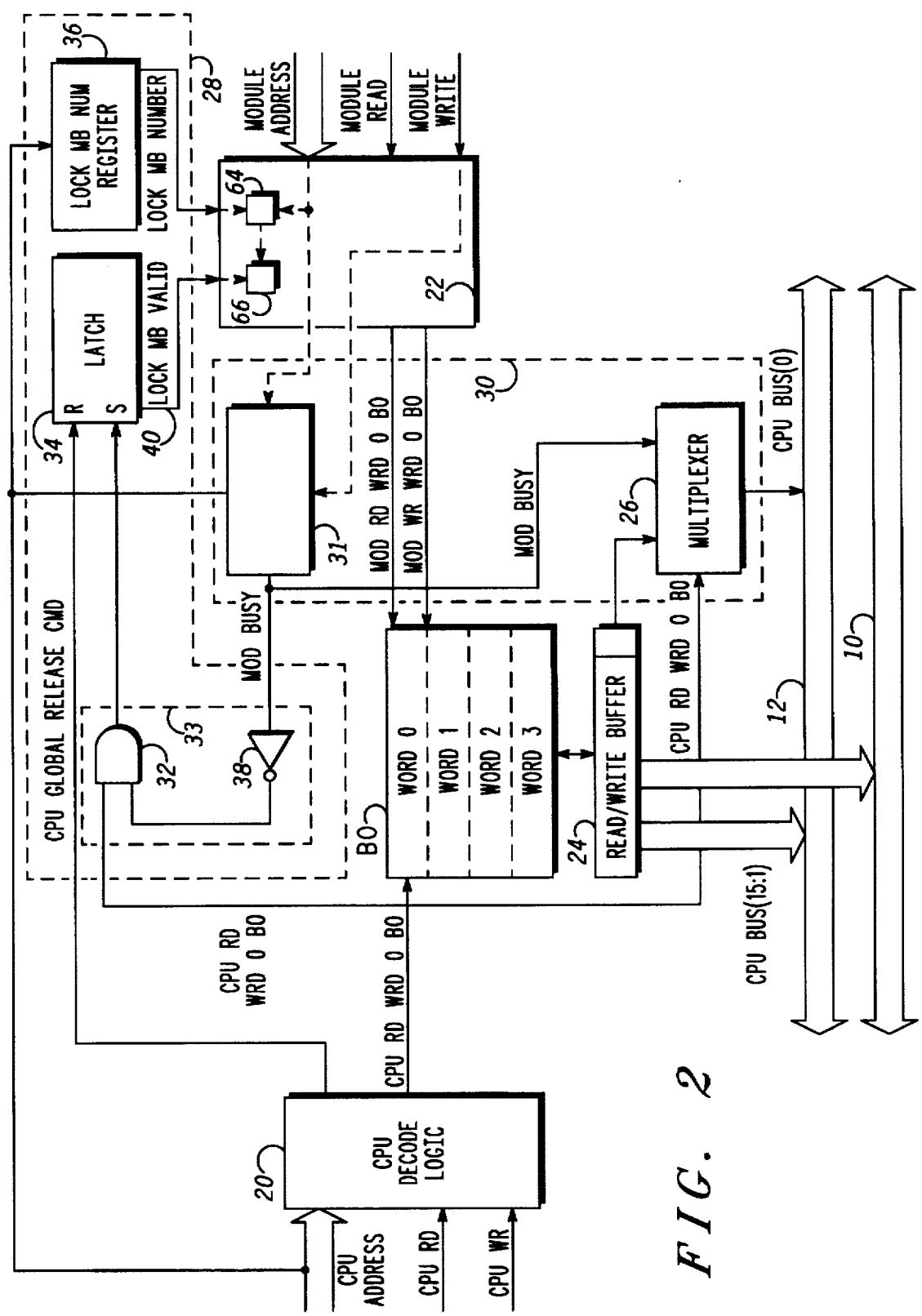
FIG. 2 is a block schematic diagram of part of the memory system shown in FIG. 1.

Referring now also to FIG. 2 which is a more detailed block schematic diagram of part of the memory system 3 in accordance with the present invention.

In the preferred embodiment, each memory buffer, only one B0 of which is shown in FIG. 2, has the capacity to store a data message comprising four data words of 16 bits. It will be appreciated however that this is for illustrative purposes only. Each memory buffer may have the capacity to store a data message comprising 2 or more data words of 8, 16, or even 32 bits.

Each data word of a data message is transferred between the memory buffer B0 and the CPU 13 or communication module 11 via a read/write buffer 24. The Least Significant Bit (LSB) [0] of a data word held in the read/write buffer 24 is transferred to the CPU 13 via a multiplexer 26 and CPU data bus 12. The remaining bits [15:1] of the data word held in the read/write buffer 24 are transferred directly to the CPU 13 via CPU data bus 12. In the preferred embodiment, a data word is transferred from the read/write buffer 24 directly to the communication module 11 via module data bus 10.

CPU decode logic 20 receives and decodes an address signal (cpu_addr) from the CPU 13, which address signal selects one of the memory buffers B0-BM to which or from which a data message is to be written or read by the CPU 13 according to the state of the read (cpu_rd) and write (cpu_wr) signals, which signals are also generated by the CPU 13.

At the start of a CPU read access, the CPU decode logic 20 generates a first word read signal (cpu_rd_wrd_0_B0) which is supplied to memory buffer B0. In response to the first word read signal (cpu_rd_wrd_0_B0), the first data word of the data message stored in the memory buffer B0 is read from the memory buffer B0 and transferred to the read/write buffer 24. The remaining data words of the data message are then read out consecutively from the memory buffer B0 to the read/write buffer 24.

Module decode logic 22 receives and decodes an address signal (module_addr) from the communication module 11, which address signal selects one of the memory buffers B0-BM to which or from which a data message is to be written or read by the communication module 11 according to the state of the read (module_rd) and write (module_wr) signals, which signals are also generated by the communication module 11.

At the start of a communication module read access, the module decode logic 22 generates a first word read signal (mod_rd_wrd_0_B0) which is supplied to memory buffer B0. In response to the first word read signal (mod_rd_wrd_0_B0), the first data word of the data message stored in the memory buffer B0 is read from the memory buffer B0 and transferred to the read/write buffer 24. The remaining data words of the data message are then read out consecutively from the memory buffer B0 to the read/write buffer 24. Similarly at the start of a communication module write access, the module decode logic 22 generates a first word write signal (mod_wr_wrd_0_B0) which is supplied to memory buffer B0. In response to the first word write signal (mod_wr_wrd_0_B0), the first data word of the data message held in the read/write buffer 24 is transferred to the memory buffer B0. The remaining data words of the data message are then written consecutively to the memory buffer B0.

The memory system 3 further comprises first logic circuitry 28 for generating a lock signal for memory buffer B0 when CPU 13 reads a data message from the memory buffer B0 whilst the communication module 11 is not writing a data message to the memory buffer B0. The first logic circuitry 28 comprises a register 36, logic gate circuitry 33 and latch circuitry 34.

The register 36 is coupled to receive the address signal (cpu_addr) from the CPU 13, during a CPU access, and stores a value (lock_MB_member) representative of the address of the memory buffer, such as B0, B1, B2, to which the CPU 13 is to perform an access. The register 36 has an output coupled to the module decode logic 22.

In the preferred embodiment, the logic gate circuitry 33 comprises an AND gate 32 and an NOT gate 38. The AND gate 32 has a first input coupled to receive the first word read signal (cpu_rd_wrd_0_B0) from the CPU decode logic 20, a second input and an output. The NOT gate 38 has an input coupled to receive a busy signal (mod_busy), which busy signal (mod_busy) is generated by second logic circuitry 30 and an output coupled to the second input of the AND gate 32.

In the preferred embodiment the latch circuitry 34 is a set-reset flip-flop or any other type of memory element. The output of the AND gate 32 is coupled to a set input of the flip-flop 34. A control signal (cpu_global_release_cmd) generated by the CPU decode logic 20 is coupled to a reset input of the flip-flop 34. The lock signal is provided at an output of the flip-flop 34, the output being coupled to the module decode logic 22. In the preferred embodiment, the lock signal comprises a lock signal valid bit (lock_MB_valid). The lock signal for a memory buffer is valid when the lock signal valid bit for the memory buffer is set to a first logic state, which in the preferred embodiment is a logic "1" and invalidated when the lock signal valid bit is reset or negated to a second logic state, logic "0".

The second logic circuitry 30 generates the busy signal (mod_busy) when the communication module 11 starts to access the memory buffer B0 and the CPU 13 is not reading the data message stored in the memory buffer B0. The second logic circuitry 30 comprises circuitry 31 and the multiplexer 26.

Figure 5:
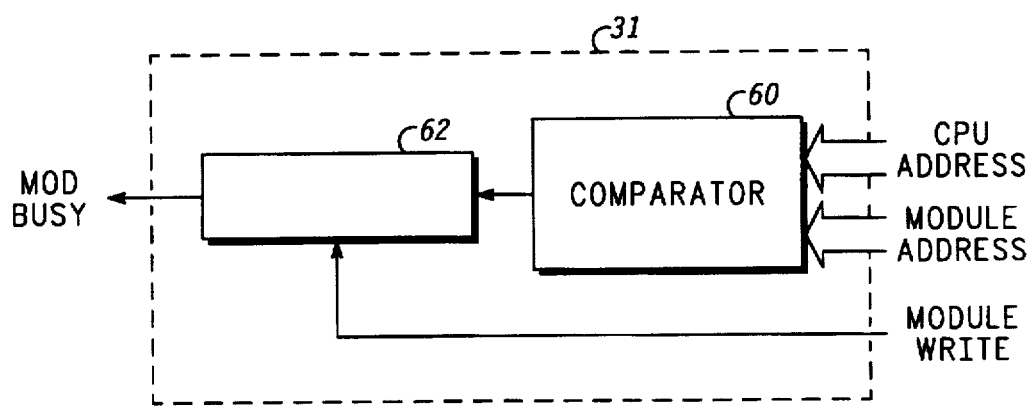
FIG. 5 is a more detailed block schematic diagram of part of the second logic circuitry of the memory system of FIG. 2.

With reference now also to FIG. 5, the circuitry 31 comprises comparator circuitry 60 and logic 62. The comparator circuitry 60 has a first input coupled to receive the address signal (cpu_addr) of a memory buffer generated by the CPU 13 and a second input coupled to receive the address signal (module_addr) of a memory buffer generated by the communication module 11. An output of the comparator circuitry 60 provides a match signal when the address at the first input corresponds to the address at the second input and a no-match signal when the address at the first input does not correspond to the address at the second input. The logic 62 has an input coupled to the output of the comparator circuitry 60 and an input coupled to receive the communication module write signal (module_write), which signal is generated by the communication module 11.

The logic 62 provides the busy signal having the first logic state, logic "1", when the match signal is provided at the output of the comparator circuitry 60 and the communication module write signal (module_write) indicates the communication module 11 is writing to the memory buffer or the busy signal having the second logic state, logic "0", when the no-match signal is provided at the output of the comparator circuitry 60 or when the communication module write signal (module_write) indicates the communication module 11 is not writing to the memory buffer.

The multiplexer 26 has a first input coupled to receive the LSB from the read/write buffer 24, a second input coupled to receive the busy signal (mod_busy) generated at the output of the logic 62, an output and a control input for receiving the first word read signal (cpu_rd_wrd_0_B0) generated by the CPU decode logic 20, which controls whether the signal at the first input or second input is coupled to the output of the multiplexer 26 which is coupled to the CPU data bus 12.

The present invention is described wherein the busy signal forms the LSB of the first data word as it is read by the CPU 13. However, it could also be any of the bits of the first data word. For example, it could be the Most Significant Bit (MSB).

In the preferred embodiment, the module decode logic 22 comprises comparator circuitry 64 having a first input coupled to the output of the register 36, and a second input coupled to receive the address signal (module_addr) of a memory buffer generated by the communication module 11. An output of the comparator circuitry 64 is coupled to logic 66 for providing thereto a match signal when the address value (lock_MB_number) at the first input corresponds to the address (module_addr) at the second input and a no-match signal when the address value (lock_MB_number) at the first input does not match the address (module_addr) at the second input. The logic 66 is also coupled to receive the lock signal valid bit (lock_MB_valid).

The logic 66 generates a signal which is used by the module decode logic 22 to prevent the communication module 11 from writing a data message to a memory buffer when the match signal is provided at the output of the comparator circuitry 64 and the lock signal valid bit (lock_MB_valid) has the first logic state or a signal which is used by the module decode logic to allow the communication module 11 to write a data message to a memory buffer when the no-match signal is provided at the output of the comparator circuitry 64 or when the lock signal valid bit (lock_MB_valid) has the second logic state.

The comparator circuitry 64 of the module decode logic 22 and the comparator circuitry 60 of the second logic circuitry 30 may be implemented by one comparator.

Figure 3:
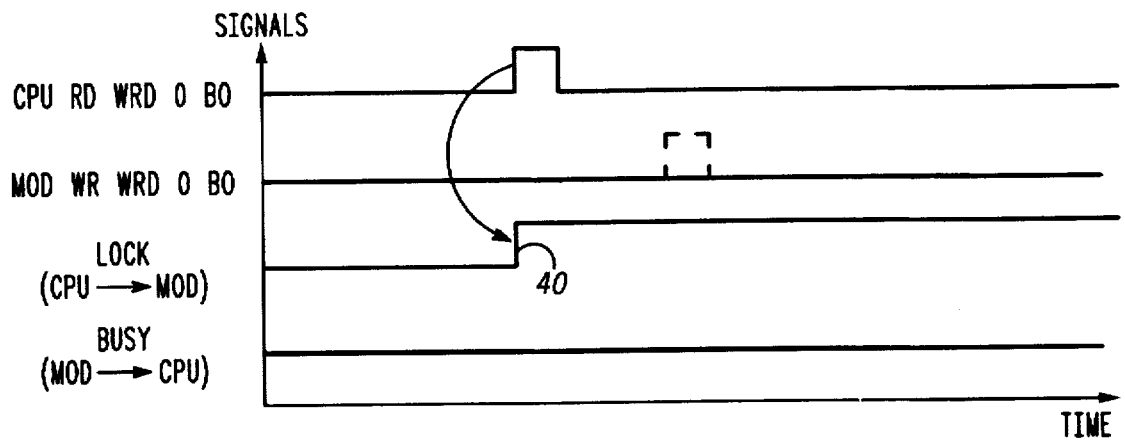
FIG. 3 shows representations of a number of signals generated during a processor unit read access in the data communications system of FIG. 1.

The operation of the memory system 3 will now be described with reference to FIGS. 1 to 5. FIG. 3 shows representations of a number of signals generated during a CPU read access and FIG. 4 shows representations of similar signals as FIG. 3 but during a communication module write access.

When the communication module 11 is to store a received data message in a predetermined one of the plurality of memory buffers B0–BM of the memory array 4, say memory buffer B0, the received data message is transferred to the temporary buffer 5 via data bus 10 and write signal (module_write) is provided to the module decode logic 22 and the address (module_addr) of the predetermined one memory buffer B0 is also provided to the module decode logic 22.

Figure 4:
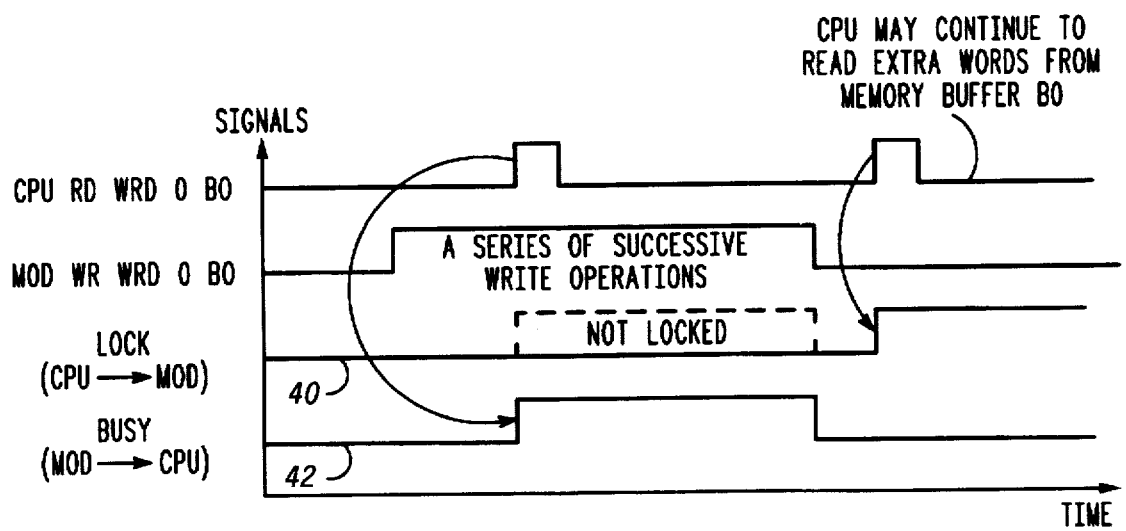
FIG. 4 shows representations of a number of signals generated during a communication module write access in the data communications system of FIG. 1.

In the case when the CPU 13 is not accessing the predetermined one of the memory buffers B0, a no-match signal is provided at the output of the comparator circuitry 64, the module decode logic 22 generates the first word write signal (mod_wr_wrd_0_B0) and the data message is written to the memory buffer B0 via the read/write buffer 24, a data word at a time (FIG. 4).

Once the data message is stored in the memory buffer B0, an interrupt may be supplied to the CPU 13. This is the normal flow of events when there is no simultaneous access of the same memory buffer by both the CPU 13 and the communication module 11.

When the CPU 13 initiates a read access to memory buffer B0 whilst the communication module 11 is writing a data message to the same memory buffer B0, the CPU decode logic 20 generates and provides the first word read signal (cpu_rd_wrd_0_B0) having the first logic state to the message buffer B0, the control input of the multiplexer 26 and the first input of the AND gate 32.

In addition, the address of memory buffer B0 is provided to the register 36 so that when the comparator 60 of the second logic circuitry 30 compares the address (module_addr) of the memory buffer B0, which memory buffer B0 is being accessed by the communication module 11, with the value stored in the register 36, a match signal is generated at the output of the comparator circuitry 60. Since the communication module 11 is writing a data message to the memory buffer B0, in response to the communication module write signal (module_write), the logic 62 provides the busy signal 42 having the first logic state, logic "1".

When the first data word from buffer B0 is transferred from the read/write buffer 24 to the CPU data bus 12, since the second input of the multiplexer 26 is selected by the first word read signal (cpu_rd_wrd_0_B0), the busy signal 42 having a logic "1" is transferred to the CPU 13 as the LSB of the first data word. In response to the LSB of the first data word read by the CPU 13 having a logic "1", the CPU 13 defers reading the data message from the memory buffer B0. Although the CPU 13 reads at least the first data word of the data message stored in memory buffer B0, the memory buffer B0 is not locked since the busy signal is set to logic "1".

Once the communication module 11 has finished writing to the memory buffer B0, the second logic circuitry 30 negates the busy signal 42 to a second logic state, logic "0", and interrupts the CPU 13. The CPU 13 can then read memory buffer B0. Alternatively, the CPU 13 may poll the busy signal 42 to detect when it is negated to the logic "0" state. Hence by using the busy signal 42, the CPU 13 can avoid the possibility of reading mixed data from two different data messages.

When the CPU 13 starts to read a data message stored in one of the memory buffers, say memory buffer B1, and the communication module 11 is not writing to the same memory buffer B1, the CPU 13 locks the memory buffer B1 preventing the communication module 11 from subsequently writing a data message to the same memory buffer B1. The communication module will not access the locked memory buffer B1 until the CPU 13 unlocks the memory buffer B1. The CPU 13 locks the memory buffer as follows.

The CPU decode logic 20 generates and provides the first word read signal (cpu_rd_wrd_0_B1) having the first logic state, logic "1", to the message buffer B1, the control input of the multiplexer 26 and the first input of the AND gate 32. In addition, the address (cpu_addr) of the memory buffer B1 is provided to the register 36 which stores a value representative of the address of memory buffer B1.

When the communication module 11 is not accessing the memory buffer B1, the busy signal generated by the second logic circuitry 30 has the second logic state, logic "0". Thus, the output of the AND gate 32 is a logic "1" which sets the lock signal valid bit 40 (lock_MB_valid) at the output of the flip-flop 34 to a logic "1" (see FIG. 3). When the first word read signal (cpu_rd_wrd_0_B1) has a logic "1", the second input of the multiplexer 26 is selected so that when the first data word is transferred from the read/write buffer 24 to the CPU 13, a busy signal having a logic "0" forms the LSB of the first data word.

Whilst the CPU 13 is reading the contents of memory buffer B1, if the communication module 11 initiates a write access to memory buffer B1, the data message is transferred to the temporary buffer 5 but the data message is not then transferred to the memory buffer B1.

The lock signal valid bit 40 at the output of the flip-flop 34 and the value stored in the register 36 are provided to the module decode logic 22. The comparator circuitry 64 of the module decode logic 22 compares the address (module_addr) of the memory buffer B1 to which the received data message is to be written, with the value stored in the register 36 and if there is a match, the comparator circuitry 64 provides a match signal to the logic 66. When the logic 66 receives the match signal and the lock signal valid bit 40 set to a logic "1", the module decode logic 22 in response to the logic 66 does not generate the first word write signal (mod_wr_ard_0_B1) and the data message is not written to the memory buffer B1. It is held in the temporary buffer 5 until the lock signal is invalidated or updated.

The temporary buffer 5 preferably has the capacity to store more than one data message so that when a data message is temporarily held in the temporary buffer 5, any new messages from the communication module are not lost.

In the preferred embodiment, the lock signal is invalidated or updated two possible ways.

When the CPU 13 reads a different memory buffer, say for example B2, the value in the register 36 is updated so that a value representing the address of the different memory buffer B2 is stored in the register 36. The address of the previously locked memory buffer B1 is therefore no longer stored in the register 36 and so the lock signal for memory buffer B1 is invalidated or updated. The CPU 13 releases the previously locked memory buffer B1 whose contents is therefore no longer needed. Upon release, the data message for memory buffer B1, which is held in temporary buffer 5, is transferred to the memory buffer B1. A memory buffer thus remains locked for any further incoming data messages until released. This method saves CPU overhead and is useful if the CPU 13 periodically scans all the memory buffers.

Alternatively, the CPU decode logic 20 under the control of the CPU 13 generates a control signal (cpu_global_release_comd) which resets flip-flop 34 such that the lock signal valid bit at the output of the flip-flop 34 is negated to logic "0". Even when the comparator circuitry 64 obtains a match between the address of the destination memory buffer B1 and the value stored in the register 36, since the logic 66 receives the lock signal valid bit having a logic "0", the lock signal for the memory buffer B1 is invalidated, the memory buffer is not locked and the data message from the communication module 11 can be written to the memory buffer B1.

Only one memory buffer can be locked at a time and only one memory buffer can be 'busy' at a time.

The present invention thus provides a solution to data coherency problem with a number of advantages over the prior art semaphore system described above.

Since the lock signal is set in parallel with a CPU read operation, no CPU overhead is required to set a semaphore for the communication module as in the prior art semaphore system. Furthermore, since a memory buffer can be unlocked by a CPU read access to a different memory buffer, no CPU operation is required to negate the lock signal or unlock the memory buffer. This can save CPU overhead.

In the system in accordance with the present invention, the CPU 13 determines whether a memory buffer is being written to by the communication module 11 by reading the LSB of the first data word read from the memory buffer. If the LSB has a logic "1" state, the CPU 13 knows that the communication module is accessing the memory buffer and that it should defer reading the memory buffer. Thus, the CPU 13 does not have to execute any special access or any other actions in order to verify the status of the memory buffer. The busy signal is part of the data message read by the CPU so there is no CPU overhead for receiving the busy signal.

Unlike the prior art semaphore system, the busy signal does not occupy memory location but is rather generated by the second logic circuitry which detects the required set of conditions.

In summary, the present invention minimises CPU overhead, minimises the required semaphore bits and simplifies the design of the communication module's control logic.

The invention has been described in relation to maintaining data coherency as the CPU 13 reads data from the memory system 3. Generally, it is less of a concern to maintain data coherency as the communication module 11 reads data from the memory system 3. However, it would be apparent to a person skilled in the art that the present invention may be applied to solving the problem of data coherency as the communication module reads data from the memory system 3.

We claim:

1. A memory system for storing data messages communicated between a processor unit and a communication module, the memory system comprising:

a memory array having a plurality of memory buffers, each buffer for storing a data message comprising at least two data words;

first logic circuitry for generating a lock signal for a memory buffer of the plurality of memory buffers, the lock signal being valid when the processor unit reads the first data word of the data message stored in the memory buffer whilst the memory buffer is not being accessed by the communication module, the lock signal for the memory buffer being invalidated when the processor unit reads the first data word of the data message stored in a different memory buffer;

module decode logic coupled to the first logic circuitry for receiving the lock signal, the module decode logic preventing the communication module from writing a data message to the memory buffer when a valid lock signal has been generated by the first logic circuitry for that memory buffer and allowing the data message to be written to the memory buffer when the lock signal for that memory buffer is invalidated; and second logic circuitry for generating and providing a busy signal to the processor unit when the processor unit reads the first data word from the memory buffer, the busy signal forming part of the first data word read from the memory buffer, and having a first logic state when the memory buffer is being written to by the communication module and having a second logic state when the memory buffer is not being written to by the communication module.

2. A memory system according to claim 1 wherein the first logic circuitry comprises:

a register having an input for receiving an address of the memory buffer generated by the processor unit and for storing an address value representing the received address, the register further having an output coupled to the module decode logic;

logic gate circuitry having a first input coupled to receive a first word read signal generated when the processor unit reads the first data word from the memory buffer, a second input coupled to receive the busy signal and an output for providing an output signal;

latch circuitry having an input coupled to the output of the logic gate circuitry and an output for providing the lock signal to the module decode logic, the latch circuitry providing the valid lock signal or the invalidated lock signal in dependence on the logic state of the output signal at the output of the logic gate circuitry.

3. A memory system according to claim 2 wherein the module decode logic comprises:

comparator circuitry having a first input coupled to the output of the register to receive the address value stored in the register, a second input coupled to receive the address of a memory buffer generated by the communication module and an output for providing a match signal when the address value at the first input corresponds to the address at the second input and a no-match signal when the address value at the first input does not match the address at the second input; and logic coupled to the output of the comparator circuitry and to receive the lock signal for generating a signal which prevents the communication module from writing a data message to the memory buffer when the match signal is provided at the output of the comparator circuitry and the lock signal is valid or a signal which allows the communication module to write a data message to the memory buffer when the no-match signal is provided at the output of thee comparator circuitry or when the lock signal is invalidated.

4. A memory system according to claim 3 wherein the logic gate circuitry comprises:

an AND gate having a first input coupled to the first input of the logic gate circuitry, a second input and an output coupled to the output of the logic gate circuitry; and a NOT gate having an input coupled to receive the busy signal and an output coupled to the second input of the AND gate.

5. A memory system according to claim 2 wherein the latch circuitry has a second input coupled to receive a control signal from the processor unit, the latch circuitry invalidating the lock signal in response to receiving the control signal.

6. A memory system according to claim 1 wherein the first logic circuitry generates a lock signal comprising a lock signal valid bit, the lock signal being valid when the lock signal valid bit has a first logic state and being invalidated when the lock signal valid bit has a second logic state.

7. A memory system according to claim 1 wherein the lock signal is invalidated in response to a control signal generated by the processor unit.

8. A memory system according to claim 1 wherein the second logic circuitry comprises:

circuitry comprising:

comparator circuitry having a first input coupled to receive the address of the memory buffer which is generated by the processor unit and a second input coupled to receive the address of a memory buffer which is generated by the communication module and an output for providing a match signal when the address at the first input corresponds to the address at the second input and a no-match signal when the address at the first input does not correspond to the address at the second input, and logic coupled to the output of the comparator circuitry and to receive a communication module write signal, the logic providing the busy signal having the first logic state when the match signal is provided at the output of the comparator circuitry and the communication module write signal indicates the communication module is writing to the memory buffer or the busy signal having the second logic state when the no-match signal is provided at the output of the comparator circuitry or when the communication module write signal indicates the communication module is not writing to the memory buffer; and a multiplexer having a first input coupled to receive a bit of each data word of the data message when a data message is read by the processor unit, a second input coupled to receive the busy signal and a control input coupled to receive a first word read signal generated by the processor unit, the first word read signal having a first logic state when the processor unit reads the first data word from the memory buffer and a second logic state when the processor unit is not reading the first data word from the memory buffer, and an output for transferring the bit or the busy signal to the processor unit as part of the data word read from the memory buffer depending on which input of the first and second inputs is selected, the multiplexer selecting the second input in response to receiving the first word read signal having the first logic state and selecting the first input in response to receiving the first word read signal having the second logic state.

9. A memory system according to claim 1 wherein the busy signal forms a bit of the first data word of the data message as the processor unit reads the data message from the memory buffer.

10. A memory system according to claim 9 wherein the busy signal forms the Least Significant Bit (LSB) of the first data word of the data message as the processor unit reads the data message from the memory buffer.

11. A data communications system comprising:
   a processor unit for transmitting and receiving data messages;
   a communication module for transmitting and receiving data messages; and
   a memory system for storing data messages received from the communication module for subsequent transmission to the processor unit and for storing data messages received from the processor unit for subsequent transmission to the communication module, the memory system comprising:
   a memory array having a plurality of memory buffers, each buffer for storing a data message comprising at least two data words;
   first logic circuitry for generating a lock signal for a memory buffer of the plurality of memory buffers, the lock signal being valid when the processor unit reads the first data word of the data message stored in the memory buffer whilst the memory buffer is not being accessed by the communication module, the lock signal for the memory buffer being invalidated when the processor unit reads the first data word of the data message stored in a different memory buffer;
   module decode logic coupled to the first logic circuitry for receiving the lock signal, the module decode logic preventing the communication module from writing a data message to the memory buffer when a valid lock signal has been generated by the first logic circuitry for that memory buffer and allowing the data message to be written to the memory buffer when the lock signal for that memory buffer is invalidated; and
   second logic circuitry for generating and providing a busy signal to the processor unit when the processor unit reads the first data word from the memory buffer, the busy signal forming part of the first data word read from the memory buffer, and having a first logic state when the memory buffer is being written to by the communication module and having a second logic state when the memory buffer is not being written to by the communication module.

12. A memory system according to claim 11 wherein the first logic circuitry comprises:
   a register having an input for receiving an address of the memory buffer generated by the processor unit and for storing an address value representing the received address, the register further having an output coupled to the module decode logic;
   logic gate circuitry having a first input coupled to receive a first word read signal generated when the processor unit reads the first data word from the memory buffer, a second input coupled to receive the busy signal and an output for providing an output signal;
   latch circuitry having an input coupled to the output of the logic gate circuitry and an output for providing the lock signal to the module decode logic, the latch circuitry providing the valid lock signal or the invalidated lock signal in dependence on the logic state of the output signal at the output of the logic gate circuitry.

13. A memory system according to claim 12 wherein the module decode logic comprises:
   comparator circuitry having a first input coupled to the output of the register to receive the address value stored in the register, a second input coupled to receive the address of a memory buffer generated by the communication module and an output for providing a match signal when the address value at the first input corresponds to the address at the second input and a no-match signal when the address value at the first input does not match the address at the second input; and
   logic coupled to the output of the comparator circuitry and to receive the lock signal for generating a signal which prevents the communication module from writing a data message to the memory buffer when the match signal is provided at the output of the comparator circuitry and the lock signal is valid or a signal which allows the communication module to write a data message to the memory buffer when the no-match signal is provided at the output of the comparator circuitry or when the lock signal is invalidated.

14. A memory system according to claim 13 wherein the logic gate circuitry comprises:
   an AND gate having a first input coupled to the first input of the logic gate circuitry, a second input and an output coupled to the output of the logic gate circuitry; and
   a NOT gate having an input coupled to receive the busy signal and an output coupled to the second input of the AND gate.

15. A memory system according to claim 12 wherein the latch circuitry has a second input coupled to receive a control signal from the processor unit, the latch circuitry invalidating the lock signal in response to receiving the control signal.

16. A memory system according to claim 11 wherein the first logic circuitry generates a lock signal comprising a lock signal valid bit, the lock signal being valid when the lock signal valid bit has a first logic state and being invalidated when the lock signal valid bit has a second logic state.

17. A memory system according to claim 11 wherein the lock signal is invalidated in response to a control signal generated by the processor unit.

18. A memory system according to claim 11 wherein the second logic circuitry comprises:
   circuitry comprising:
      comparator circuitry having a first input coupled to receive the address of the memory buffer which is generated by the processor unit and a second input coupled to receive the address of a memory buffer which is generated by the communication module and an output for providing a match signal when the address at the first input corresponds to the address at the second input and a no-match signal when the address at the first input does not correspond to the address at the second input; and logic coupled to the output of the comparator circuitry and to receive a communication module write signal, the logic providing the busy signal having the first logic state when the match signal is provided at the output of the comparator circuitry and the communication module write signal indicates the communication module is writing to the memory buffer or the busy signal having the second logic state when the no-match signal is provided at the output of the comparator circuitry or when the communication module write signal indicates the communication module is not writing to the memory buffer; and a multiplexer having a first input coupled to receive a bit of each data word of the data message when a data message is read by the processor unit, a second input coupled to receive the busy signal and a control input coupled to receive a first word read signal generated by the processor unit, the first word read signal having a first logic state when the processor unit reads the first data word from the memory buffer and a second logic state when the processor unit is not reading the first data word from the memory buffer, and an output for transferring the bit or the busy signal to the processor unit as part of the data word read from the memory buffer depending on which input of the first and second inputs is selected, the multiplexer selecting the second input in response to receiving the first word read signal having the first logic state and selecting the first input in response to receiving the first word read signal having the second logic state.

19. A memory system according to claim 11 wherein the busy signal forms a bit of the first data word of the data message as the processor unit reads the data message from the memory buffer.

20. A memory system according to claim 19 wherein the busy signal forms the Least Significant Bit (LSB) of the first data word of the data message as the processor unit reads the data message from the memory buffer.

* * * * *